United States Patent [19]
Harris

[11] Patent Number: 5,975,316
[45] Date of Patent: Nov. 2, 1999

[54] COMPACT DISC STORAGE RACK

[76] Inventor: James O. Harris, 1335 Jefferson Rd., Hoffman Estates, Ill. 60195

[21] Appl. No.: 08/734,342

[22] Filed: Oct. 21, 1996

[51] Int. Cl.[6] ................................................. A47G 29/00
[52] U.S. Cl. ............................................. 211/40; D6/407
[58] Field of Search ........................ 211/40, 41.1, 41.12; 206/307, 387.1, 387.15, 308.1; 312/9.9; D6/407

[56] References Cited

U.S. PATENT DOCUMENTS

| | | |
|---|---|---|
| D. 356,701 | 3/1995 | Chu . |
| D. 357,331 | 4/1995 | Yeh ...................................... D6/407 X |
| D. 360,099 | 7/1995 | Wu ...................................... D6/407 X |
| D. 364,512 | 11/1995 | Stravitz . |
| 4,753,343 | 6/1988 | Flynn . |
| 4,939,625 | 7/1990 | Olson . |
| 4,940,147 | 7/1990 | Hunt . |
| 4,993,558 | 2/1991 | Assael ........................................ 211/40 |
| 5,195,642 | 3/1993 | Dardashti .............................. 211/40 X |
| 5,253,767 | 10/1993 | Koeppel . |
| 5,255,970 | 10/1993 | Theosabrata . |
| 5,301,819 | 4/1994 | Moeken . |
| 5,341,943 | 8/1994 | Fraser ......................................... 211/40 |
| 5,553,720 | 9/1996 | Dardashti ................................. 211/40 |
| 5,676,260 | 10/1997 | Scneidermesser .................... 211/40 X |

*Primary Examiner*—Jose V. Chen
*Attorney, Agent, or Firm*—Meroni & Meroni; Charles F. Meroni, Jr.

[57] ABSTRACT

A compact disc storage structure or rack is provided for storing and displaying a plurality of compact discs cases. The structure resembles a skyscraper type building and includes a base and an upright elongated housing secured to the base. The housing has sidewalls defining an interior chamber therewithin. One of the sidewalls has a vertical and generally rectangular shaped slot formed therein. The slot is sized for receiving a plurality of compact disc cases and has opposite upright slot sidewalls. The slot sidewalls have a plurality of support structures with each support structure adapted for holding and supporting a compact disc case. The elongated housing has a plurality of apertures extending therethrough. A light source is mounted within the interior chamber for illuminating the interior chamber and transmitting light through the apertures.

16 Claims, 7 Drawing Sheets

COMPACT DISC STORAGE RACK

BACKGROUND OF THE INVENTION

1. Field of the Invention

The present invention relates generally to display or storage racks. More particularly, the invention pertains to a compact disc storage rack adapted for storing and displaying compact discs.

2. Description of the Prior Art

Compact discs have become a popular medium for storing both music and computer software. The discs themselves are relatively thin and are sold within a plastic protective case to prevent damage. Numerous compact discs can be quickly acquired by both music enthusiasts and computer users which can lead to clutter and disorganization.

Various prior art compact disc storage racks are known in the art to provide a solution to this problem. U.S. Pat. No. 5,195,642 issues to Dardashti and U.S. Pat. No. Design 364,512 issued to Stravitz disclose compact disc storage towers having upright sides and slots for receiving individual compact disc cases. The upright tower configuration allows these racks to hold a large number of compact discs without requiring a large amount of floor space. However, while as functional as these storage towers are, they are not always particularly attractive. Compact disc racks or towers are commonly placed in rooms or offices that are also used to entertain guests or to meet with visitors or clients. Accordingly, it would be desirous to have a compact disc storage rack that is both functional in use and decorative.

As will be described in greater detail hereinafter, the compact disc storage rack of the present invention differs from those previously proposed and employs a number of novel features that render it highly advantageous over the prior art.

SUMMARY OF THE INVENTION

Accordingly, it is an object of this invention to provide a storage rack for holding compact discs in a manner facilitating their placement and removal from the structure.

Another object of this invention is to provide a compact disc storage rack that has a decorative appearance and resembles skyscraper type buildings.

Still another object of this invention is to provide a compact disc storage rack that is illuminated in manner that is both aesthetically pleasing as well as providing lighted assistance for a user trying to find a particular compact disc stored on the rack in a dark or dimly lit room.

To achieve the foregoing and other objectives, and in accordance with the purposes of the present invention a compact disc storage structure is provided. The structure includes a base and an upright elongated housing secured to the base. The housing has sidewalls defining an interior chamber therewithin. One of the sidewalls has a vertical and generally rectangular shaped slot formed therein. The slot is sized for receiving a plurality of compact disc cases and has opposite upright slot sidewalls. The slot has an opening generally coplanar with the sidewall having the slot. The slot sidewalls have a plurality of support structures with each support structure adapted for holding and supporting a compact disc case. The plurality of support structures are in a spaced apart relationship to one another. The elongated housing has a plurality of apertures extending therethrough. A light source is mounted within the interior chamber for illuminating the interior chamber and transmitting light through the apertures.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Referring now to the drawings, several embodiments of the storage structure or rack 10 are illustrated in FIGS. 1–4. All of the embodiments are provided with features of the present invention that are described in detail hereafter and differ most noticeable in the overall shape and size which illustrate the ability of the present invention to be adapted to resemble various known skyscraper type buildings, such as the Empire State Building shown in FIG. 1, which further aids in providing a pleasing appearance.

It should be understood that the structure 10 of the present invention is also readily adaptable to hold varied sizes of compact disc cases, as well as other similarly shaped objects such as audio or video cassette tapes, books and the like. However, the use the present invention for storing compact discs is preferred.

Figure 6:
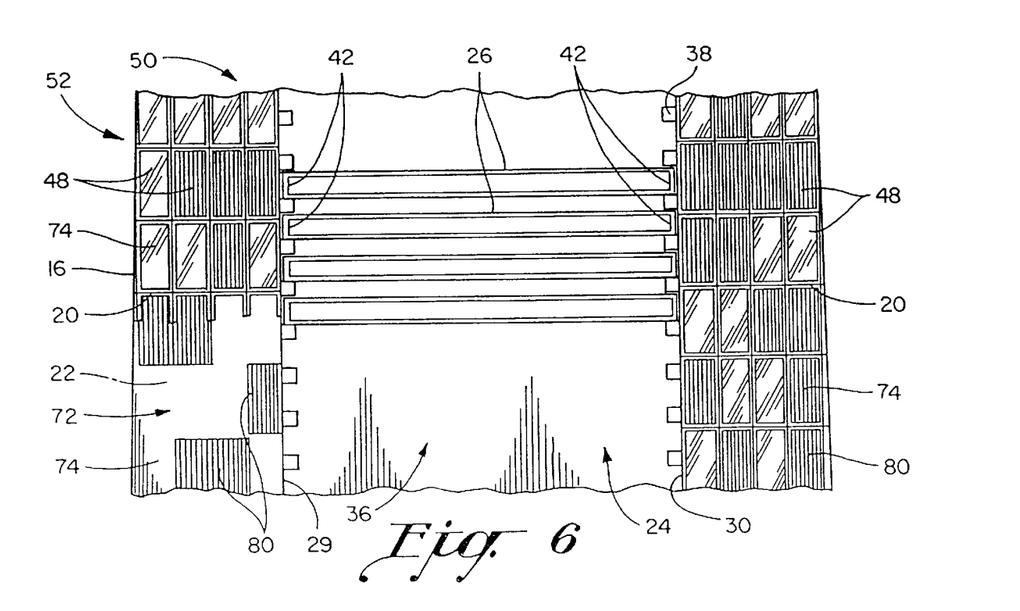
FIG. 6 is an enlarged partial front view of FIG. 5 having compact disc cases stored within a slot.
Figure 7:
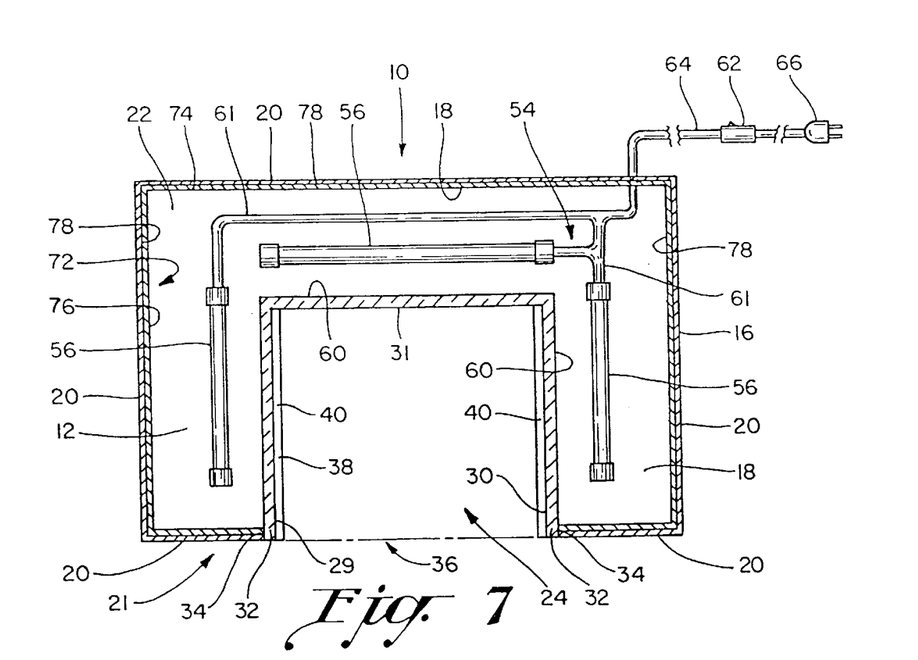
FIG. 7 is a sectional view taken along line 7—7 of FIG. 5.
Figure 10:
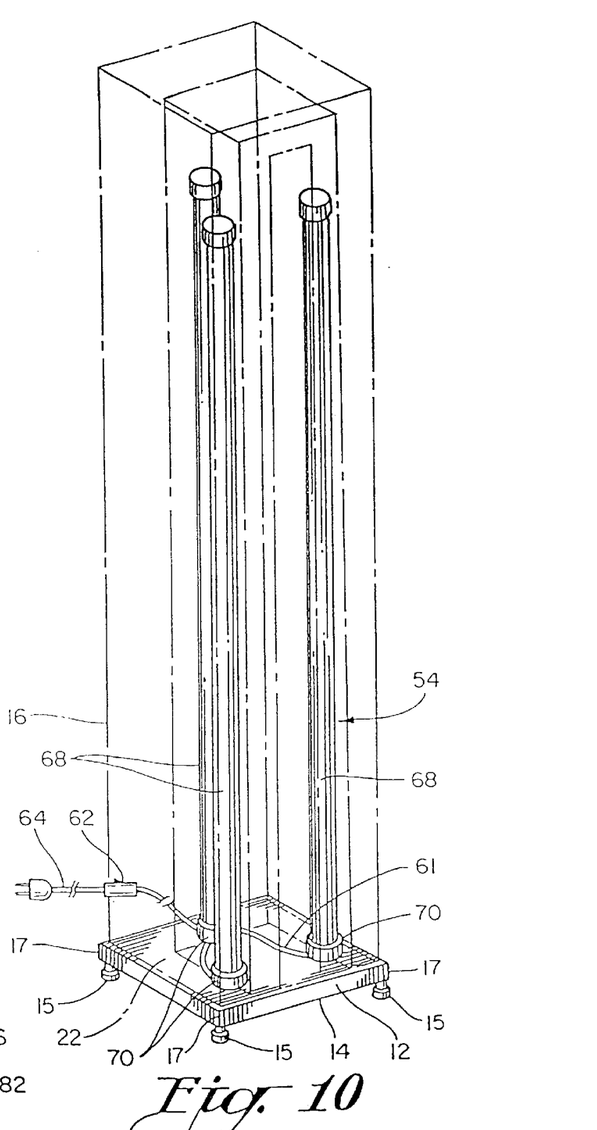
FIG. 10 is a perspective view of an alternative lighting configuration for use in the present invention.

Referring to FIGS. 4–7, the storage structure 10 is self supporting and is adapted for holding compact discs in a manner facilitating their placement and removal from the structure 10. The structure 10 includes a base 12 having a generally flat bottom surface 14 that is adapted for placement on a floor or other level surface. Additionally, rubber feet or level adjustment leg posts 15 (FIG. 10) of conventional type can be secured at corners 17 of the bottom surface 14 of the base 12 to provide for stability on carpets or soft or otherwise unlevel surfaces. An elongated housing 16 is secured to the base 12 along outer edges 18 of the base 12 (FIG. 7). The housing 16 is preferably formed of sheet metal, however it should be understood that other materials such as plastic could also be used. The housing 16 extends vertically upwardly and is specifically shaped and configured to resemble a particular building design, as shown in FIGS. 1–4. The housing 16 has sidewalls 20 defining an interior chamber 22 therewithin.

The sidewall 20 on the front side 21 of the housing 16 has a vertical and generally rectangular shaped slot 24 formed therein. The slot 24 is sized for receiving compact disc cases 26 and has opposite upright slot sidewalls 29,30 and a back sidewall 31. Referring to FIG. 7, the slot sidewalls 29, 30 and back sidewall 31 are formed integral with one another preferably from plastic. The outer vertical edges 32 of the slot sidewalls 29, 30 are secured to vertical edges 34 of the housing 16 so that an opening 36 of the slot 24 is generally coplanar with the sidewall 20 on the front side 21.

Referring to FIGS. 6 and 7, the slot sidewalls 29,30 have a plurality of support structures 38 with each support structure 38 adapted for holding and supporting a compact disc case 26 in a horizontal plane. In a preferred embodiment, the support structures 38 are ledges 40 which extend outwardly from the slot sidewalls 29, 30 for engaging outer edges 42 of the compact disc cases 26.

Figure 1:
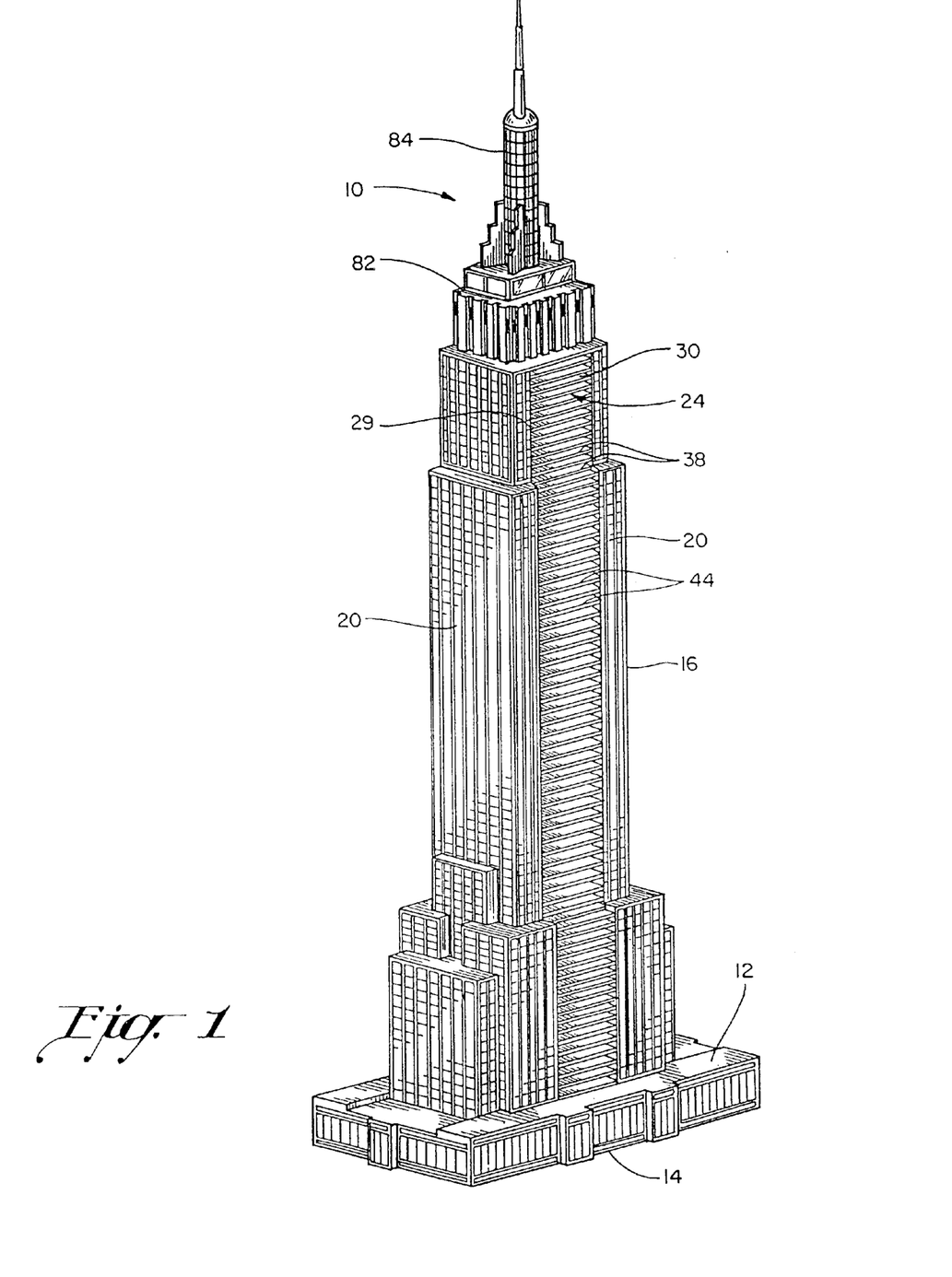
FIG. 1 is a perspective view of a first embodiment of the present invention.
Figure 2:
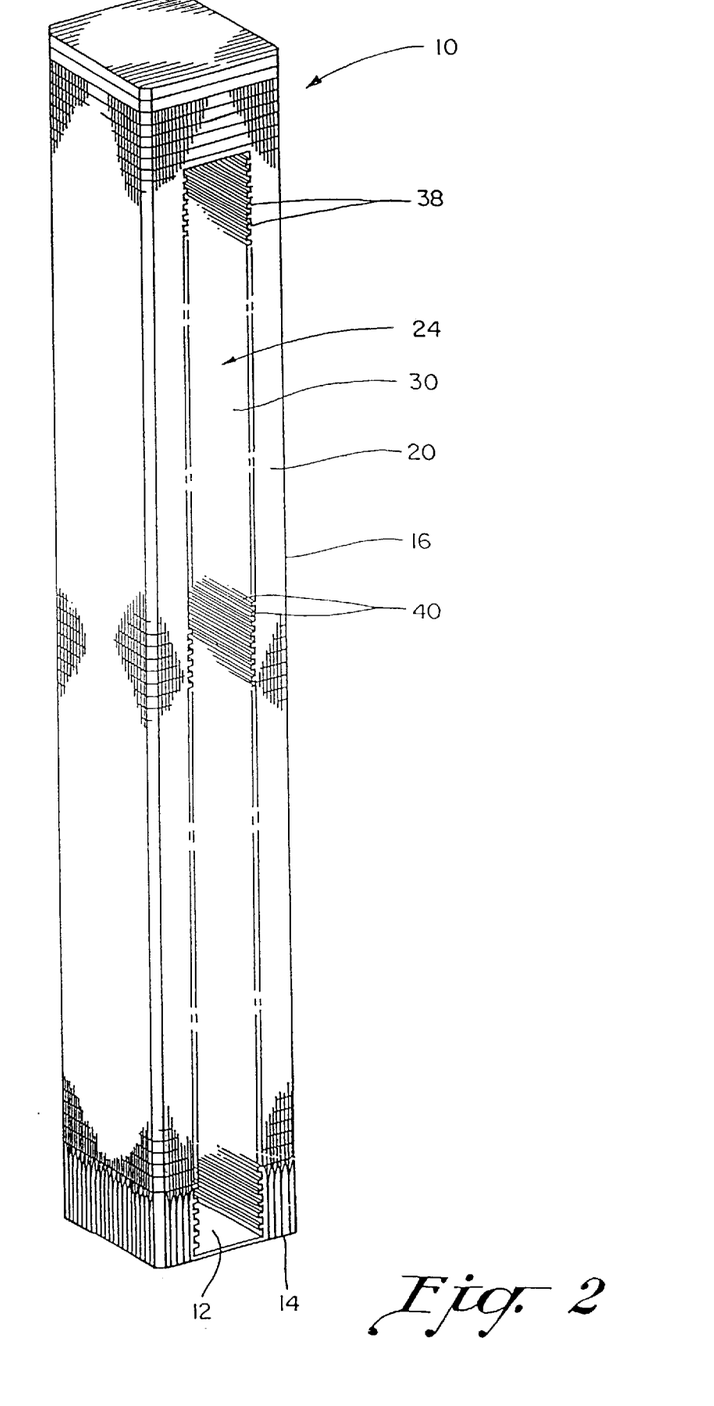
FIG. 2 is a perspective view of a second embodiment of the present invention.
Figure 3:
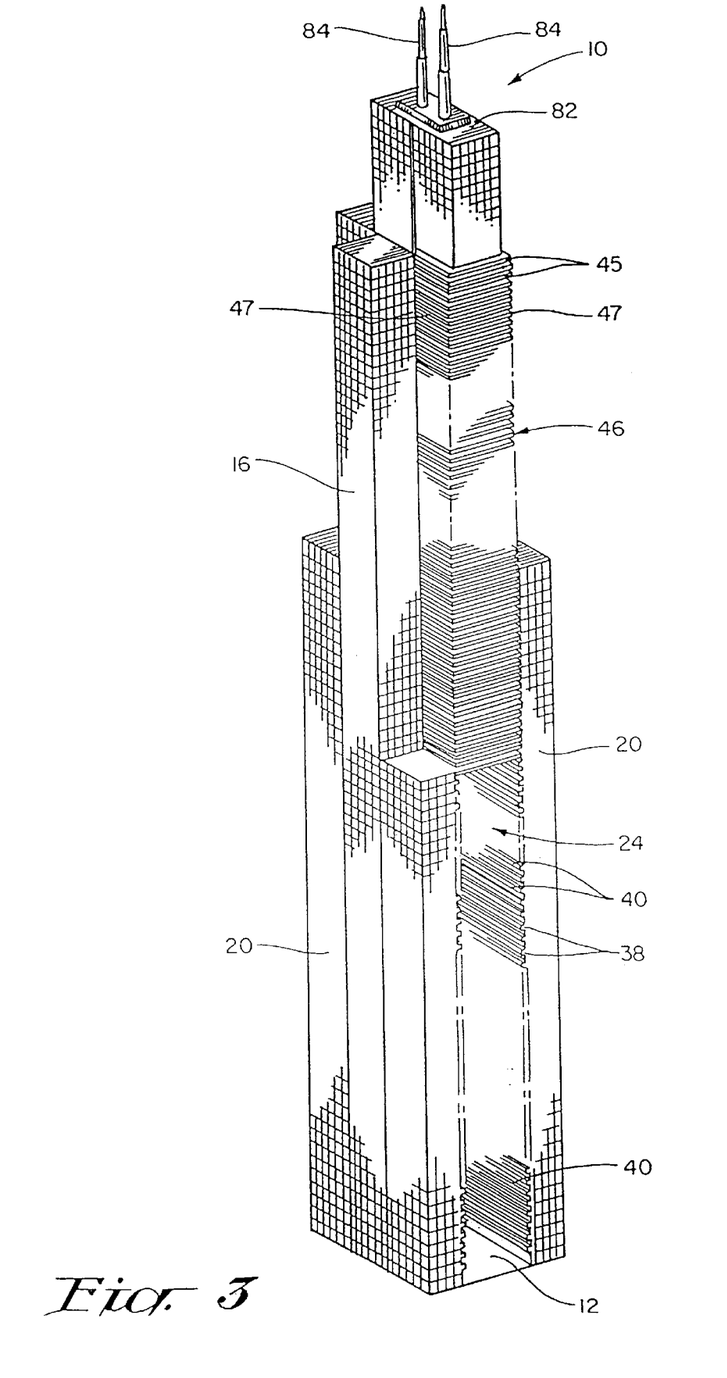
FIG. 3 is a perspective view of a third embodiment of the present invention.
Figure 4:
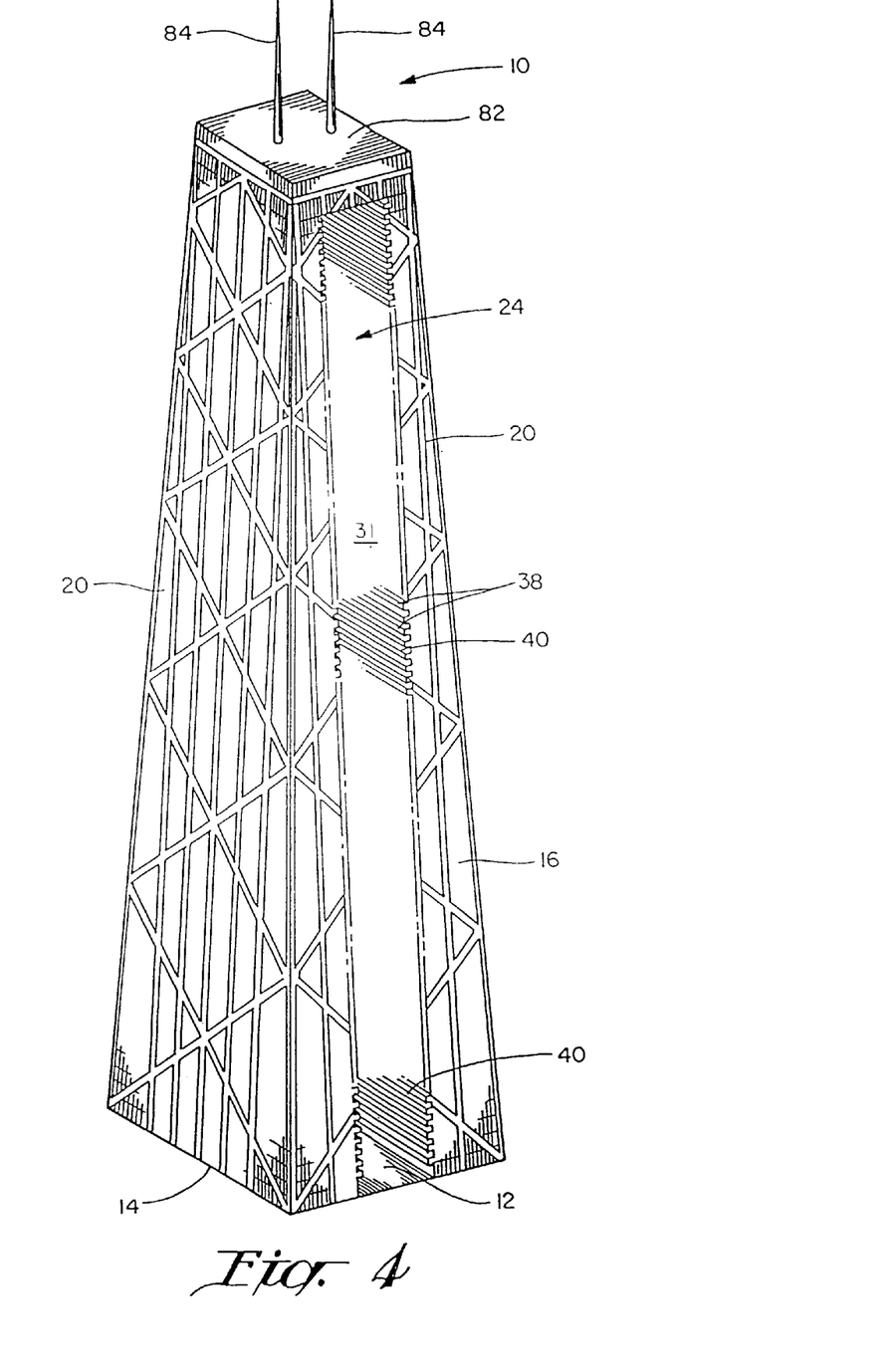
FIG. 4 is a perspective view of a fourth embodiment of the present invention.
Figure 5:
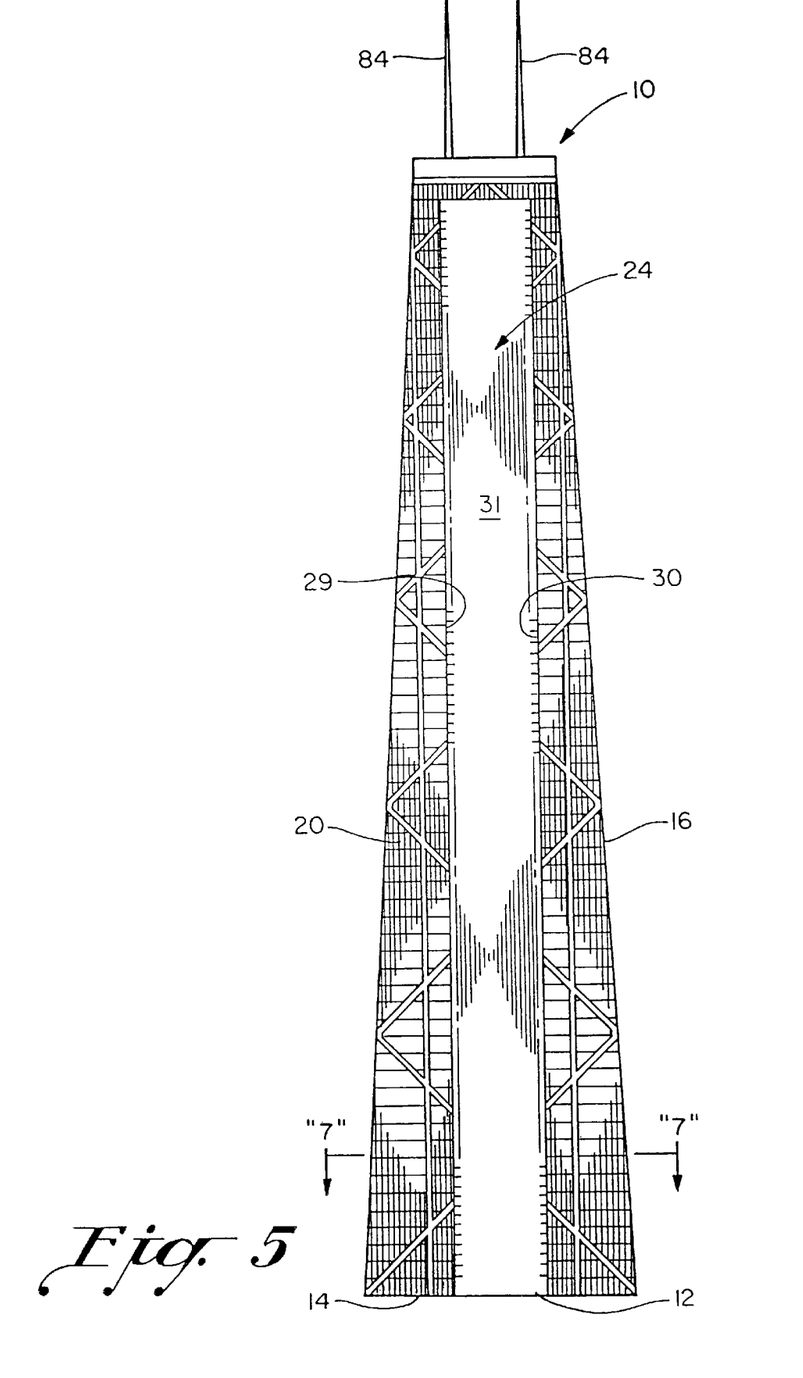
FIG. 5 is a front elevation view of the fourth embodiment.

In an alternative embodiment shown in FIG. 1, the support structures 38 are plate members 44 that extend horizontally between the slot sidewalls 29, 30. In yet another embodiment of the structure 10 shown in FIG. 3, plate members 45 having exposed side edges 47 are provided for extending from the housing 16 in a cantilever fashion above slot 24. In this embodiment, the overall desired shaped of the building did not provide for a slot 16 to extend upwardly for the entire length of the housing 16, so providing plate members 45 having spaces 46 therebetween sized to receive compact discs allows for a pleasing appearance in addition to the added functionality.

The plurality of support structures 38 are in a spaced apart relationship to one another which corresponds in the preferred embodiments to the height of a conventional compact disc case. The structures 38 may also be spaced to allow for the height of a conventional double compact disc case.

Referring to FIG. 6, the housing 16 has a plurality of apertures 48 extending therethrough. The apertures 48 are preferably rectangular shaped in that they resemble windows and are arranged in a grid like configuration forming vertical rows 50 and horizontal rows 52 of apertures 48 on the sidewalls 20.

Referring to FIG. 7, a light source 54 is mounted within the interior chamber 22 for illuminating the interior chamber 22 and transmitting light through the apertures 48. In a preferred embodiment shown in FIG. 7, the light source includes a plurality of florescent light fixtures 56 are mounted to the base 12 within the interior chamber 22 in a spaced apart relationship to one another to provide for an equal light distribution about the interior chamber which is generally U-shaped. Light fixtures 56 may also be provided at the top end 58 (FIG. 9) of the interior chamber 22 to further aid in full illumination of the chamber 22. Florescent lighting is preferred over lighting types in that florescent lighting does not generate a large amount of heat.

Interior surfaces 60 of the slot sidewalls 29,30 and back sidewall 31 disposed within the interior chamber 22 may be provided with a reflective coating to provide improved light reflection and light distribution within the interior chamber 22 which then provides for a more balanced light transmission that is directed out the apertures 48.

The light source 54 is electrically connected with wires 61 to a switch 62 of conventional type disposed on an outside of the structure for turning-on and turning-off the light source 54. Preferably, the light source 54 is powered from an AC power source with the wires 61 including a cord portion 64 having a end 66 adapted for connection with the power source. In an alternative configuration of the light source 54 shown in FIG. 10, florescent light sources or fixtures 68 are provided with each fixture 68 having a first end 70 mounted to the base 12 within the interior chamber 22. The light sources 68 extend vertically upwardly for substantially the length of the interior chamber 22.

Figure 8:
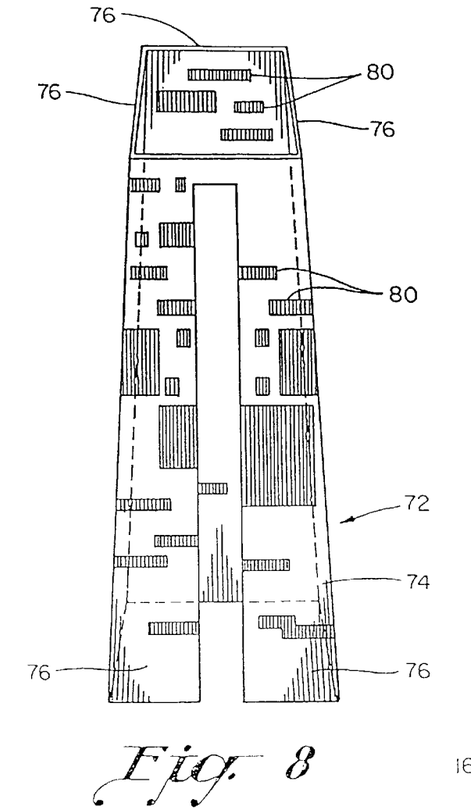
FIG. 8 is a perspective view of a liner structure of the present invention.

Referring to FIGS. 6 and 8, a blocking structure 72 is attached to the elongated housing 16 for blocking light through a predetermined set of apertures 48. Preferably, the blocking structure 72 includes a liner structure 74 sized and configured for securement within the interior chamber 22 with sidewalls 76 of the liner structure 74 in pressing or confronting engagement against an interior surface 78 of the sidewalls 20 of the housing 16. The liner structure 74 is preferably formed of a generally translucent plastic material and has a plurality of opaque portions 80 of varied size arranged on the liner structure 74 in a random type of configuration. In use, the liner structure 74 will block the light from the apertures 48 that are adjacent to opaque portions 80 to create the appearance of a building at night where various rooms of the building have the lights turned-off in random type of configuration. The light being transmitted through unblocked apertures 48 both creates a pleasing appearance as well as providing lighted assistance for a user trying to find a particular compact disc stored on the rack 10 in a dark or dimly lit room.

Figure 9:
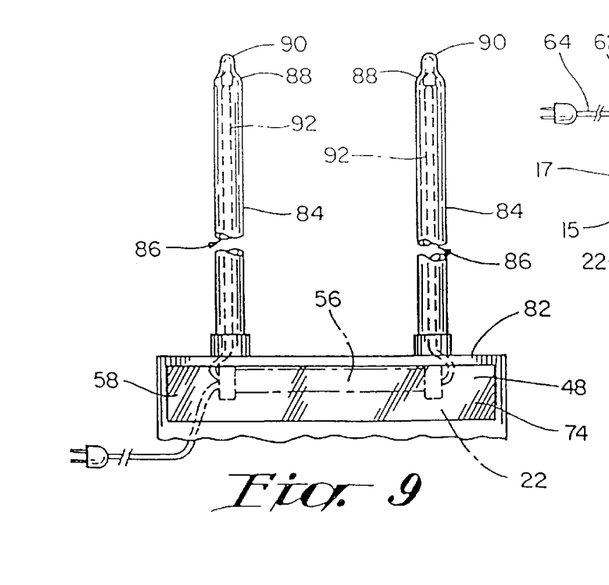
FIG. 9 is an enlarged partial front view of FIG. 5.

Referring to FIG. 9, the housing 16 has a generally horizontal top surface 82. The top surface 82 has elongated tower members 84 extending vertically therefrom. Each tower member 84 has an interior aperture 86 extending therethrough. An upper end portion 88 of the tower member 84 has a second light source 90 mounting thereto. Preferably, the second light source 90 is an LED having wires 92 electrically connected thereto with the wires 92 extending though the interior aperture 86 of the tower member 84 for connection with a power source. The LED may also have flashing circuitry incorporated therewith which can include a conventional switch to turn the flashing feature on or off. Additional lighting sources or LED's may also be added to enhance the decorative appearance of one or more of the embodiments shown.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A compact disc storage structure comprising: a base, an elongated housing secured to the base and extending vertically upwardly, the housing having sidewalls defining an interior chamber therewithin, one of said sidewalls having a vertical and generally rectangular shaped slot formed therein, the slot being sized for receiving compact disc cases and having opposite upright slot sidewalls, the slot having an opening generally coplanar with the one of said sidewalls, the slot sidewalls having a plurality of support means with each support means adapted for holding and supporting a compact disc case in a horizontal plane, the plurality of support means being in a spaced apart relationship to one another, the elongated housing having a plurality of apertures extending therethrough, the plurality of apertures being arranged in a grid like configuration forming vertical and horizontal rows of apertures on the sidewalls, lighting means mounted within the interior chamber for illuminating the interior chamber and transmitting light through the apertures, and blocking means attached to the elongated housing for blocking light through a predetermined set of apertures, the predetermined set being arranged in a random type of configuration.

2. The compact disc storage structure of claim 1, wherein the blocking means includes a liner structure sized and configured for securement within the interior chamber with sidewalls of the liner structure in engagement against an interior surface of the sidewalls of the housing.

3. The compact disc storage structure of claim 2, wherein the liner structure is formed of a generally translucent plastic material having a plurality of opaque portions arranged on the liner structure in a random type of configuration.

4. The compact disc storage structure of claim 1, wherein the lighting means includes a plurality of light sources mounted within the interior chamber in a spaced apart relationship to one another.

5. The compact disc storage structure of claim 4, wherein the lighting means includes at least one florescent light source having a first end mounted to the base, the light source extending vertically upwardly for substantially the length of the interior chamber.

6. The compact disc storage structure of claim 1, wherein the housing has a generally horizontal top surface, the top surface has an elongated tower member extending vertically therefrom, the tower member having an interior aperture extending therethrough, an upper end portion of the tower member having a second light source mounting thereto and means electrically connected to the second light source extending though the interior aperture of the tower member for connection with a power source.

7. A compact disc storage structure comprising: a base, an elongated housing secured to the base and extending vertically upwardly, the housing having sidewalls defining an interior chamber therewithin, one of said sidewalls having a vertical and generally rectangular shaped slot formed therein, the slot being sized for receiving a plurality of compact disc cases and having opposite upright slot sidewalls, the slot having an opening generally coplanar with the one of said sidewalls, the slot sidewalls having a plurality of support means with each support means adapted for holding and supporting a compact disc case, the plurality of support means being in a spaced apart relationship to one another, the elongated housing having a plurality of apertures extending therethrough, and lighting means mounted within the interior chamber for illuminating the interior chamber and transmitting light through the apertures.

8. The compact disc storage structure of claim 7, further comprising blocking means attached to the elongated housing for blocking light through a predetermined set of apertures, the predetermined set being arranged in a random type of configuration.

9. The compact disc storage structure of claim 8, wherein the blocking means includes a liner structure sized and configured for securement within the interior chamber with sidewalls of the liner structure in engagement against an interior surface of the sidewalls of the housing.

10. The compact disc storage structure of claim 9, wherein the liner structure is formed of a generally translucent plastic material having a plurality of opaque portions arranged on the liner structure in a random type of configuration.

11. The compact disc storage structure of claim 7, wherein the lighting means includes a plurality of light sources mounted within the interior chamber in a spaced apart relationship to one another.

12. The compact disc storage structure of claim 7, wherein the lighting means includes at least one light source having a first end mounted to the base, the light source extending vertically upwardly for substantially the length of the interior chamber.

13. The compact disc storage structure of claim 7, wherein the housing has a generally horizontal top surface, the top surface has an elongated tower member extending vertically therefrom, the tower member having an interior aperture extending therethrough, an upper end portion of the tower member having a second light source mounting thereto and means electrically connected to the second light source extending though the interior aperture of the tower member for connection with a power source.

14. The compact disc storage structure of claim 13, wherein the second light source is an LED.

15. A self supporting decorative storage structure for holding compact discs in a manner facilitating their placement and removal from the structure, comprising: a base adapted for placement on a floor, an elongated housing secured to the base and extending vertically upwardly, the housing having sidewalls defining an interior chamber therewithin, one of said sidewalls having a vertical and generally rectangular shaped slot formed therein, the slot being sized for receiving compact disc cases and having opposite upright slot sidewalls, the slot having an opening generally coplanar with the one of said sidewalls, the slot sidewalls having a plurality of support means with each support means adapted for holding and supporting a compact disc case in a horizontal plane, the plurality of support means being in a spaced apart relationship to one another, the elongated housing having a plurality of apertures extending therethrough, the plurality of apertures being arranged in a grid like configuration forming vertical and horizontal rows of apertures on the sidewalls, lighting means mounted within the interior chamber for illuminating the interior chamber and transmitting light through the apertures, and blocking means attached to the elongated housing for blocking light through a predetermined set of apertures, the blocking means including a liner structure sized and configured for securement within the interior chamber with sidewalls of the liner structure in pressing engagement against an interior surface of the sidewalls of the housing, the liner structure being formed of a generally translucent plastic material having a plurality of opaque portions of arranged on the liner structure in a random type of configuration.

16. The storage structure of claim 15, wherein the housing has a generally horizontal top surface, the top surface has an elongated tower member extending vertically therefrom, the tower member having an interior aperture extending therethrough, an upper end portion of the tower member having a second light source mounting thereto and means electrically connected to the second light source extending though the interior aperture of the tower member for connection with a power source.

* * * * *